INVENTOR
Robert A. Herron

Aug. 8, 1967
R. A. HERRON
3,334,471
MOISTURE CONTROL UNIT
Filed Aug. 11, 1966
2 Sheets-Sheet 2
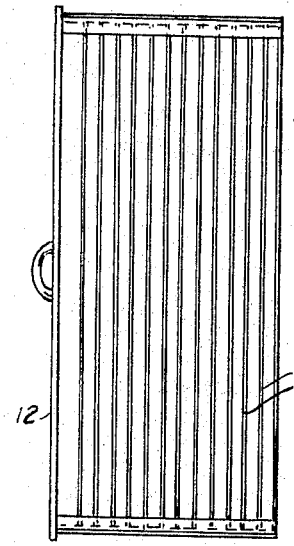
Fig. 5
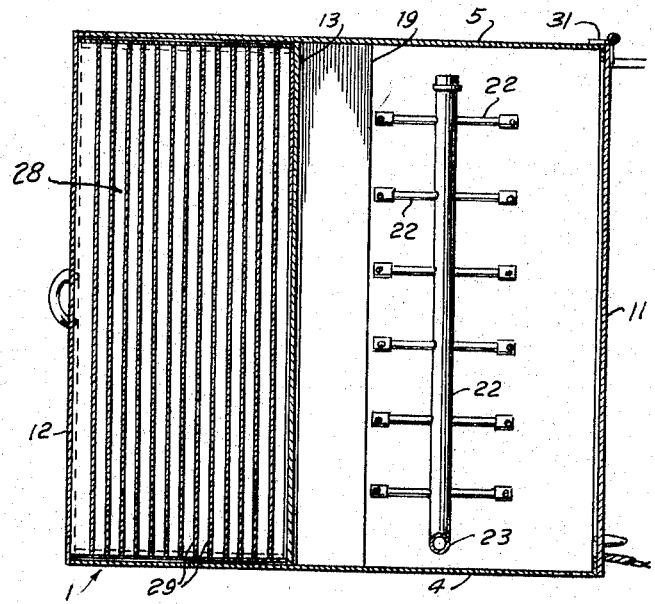
Fig. 2
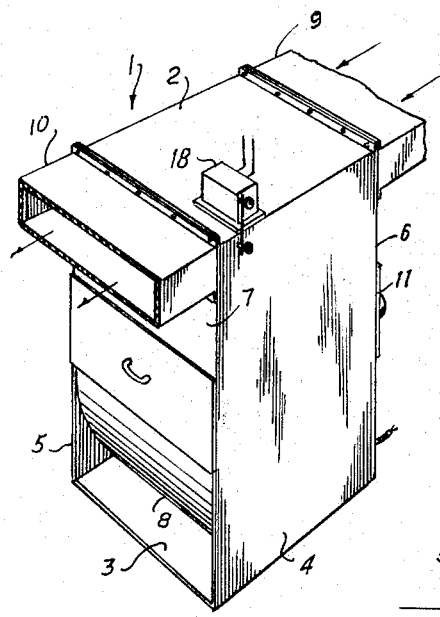
Fig. 6
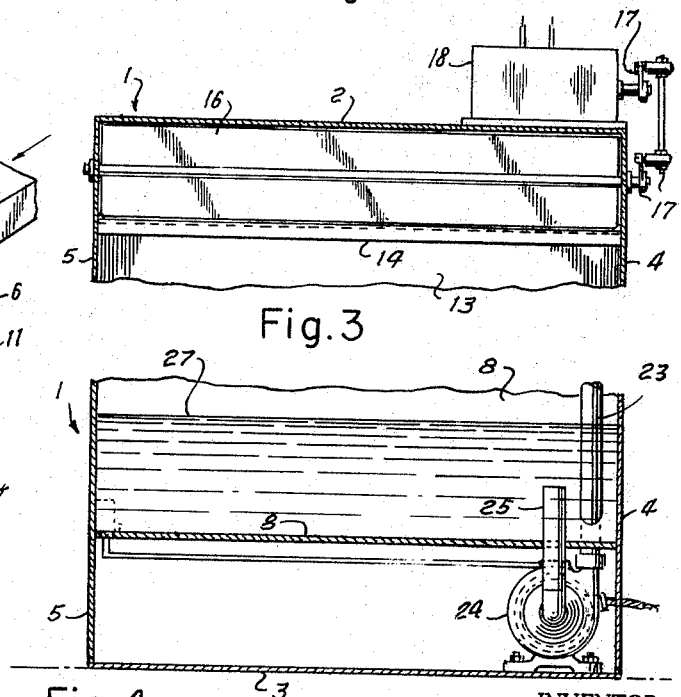
Fig. 3
Fig. 4
INVENTOR
Robert A. Herron
BY
ATTORNEY United States Patent Office 3,334,471
Patented Aug. 8, 1967

3,334,471
MOISTURE CONTROL UNIT
Robert A. Herron, Rte. 3, Box 194-J,
Lubbock, Tex. 79401
Filed Aug. 11, 1966, Ser. No. 571,878
3 Claims. (Cl. 55—224)

This invention relates to a moisture control unit, and it concerns more particularly a self contained apparatus for humidifying a stream of heated air as supplied to a cotton gin, whereby the humidity of the air may be regulated in response to the moisture content of the cotton being processed, to thereby control such moisture content.

In the operation of cotton gins it is customary to dry the cotton as it is ginned by contacting it with a stream of air. The gin ordinarily has a fan whereby a stream of air may be drawn through the cotton being processed. The air is usually heated, and several types of apparatus have heretofore been proposed, and are now in commercial use, for controlling the humidity of the heated air in response to the moisture content of the cotton being processed as contemplated by this invention.

It has long been recognized that moisture control is important, to prevent excessive dehydration of the cotton during ginning whereby its quality may be impaired, and this invention comprises certain specific improvements, as incorporated in the structure hereinafter described, which will be apparent as the description of the invention proceeds.

The moisture control unit of the invention is characterized by its simplicity and its efficient operation, whereby large amounts of heated air may be passed through a unit of given size without entraining excessive amounts of water with the humidified air as it is discharged from the unit.

An important feature of the invention is that the gin fan is not necessarily relied on to draw air through the unit, but air may be either drawn through the unit or blown through it, at high rates. For this reason the unit may be located inside the gin, which is advantageous. The unit is adapted to be installed in an existing hot air line, thus saving the cost of extra piping.

The invention will be readily understood by referring to the following description and the accompanying drawing, in which:

FIG. 2 is a sectional plan view taken on the line 2—2 of FIG. 1;

FIG. 3 is a fragmentary sectional elevational view taken on the line 3—3 of FIG. 1;

FIG. 4 is a fragmentary sectional elevational view taken on the line 4—4 of FIG. 1;

FIG. 5 is a top plan view showing a portion of the apparatus illustrated in FIG. 2 in its detached position; and FIG. 6 is a perspective view of the apparatus, on a reduced scale.

Figure 1:
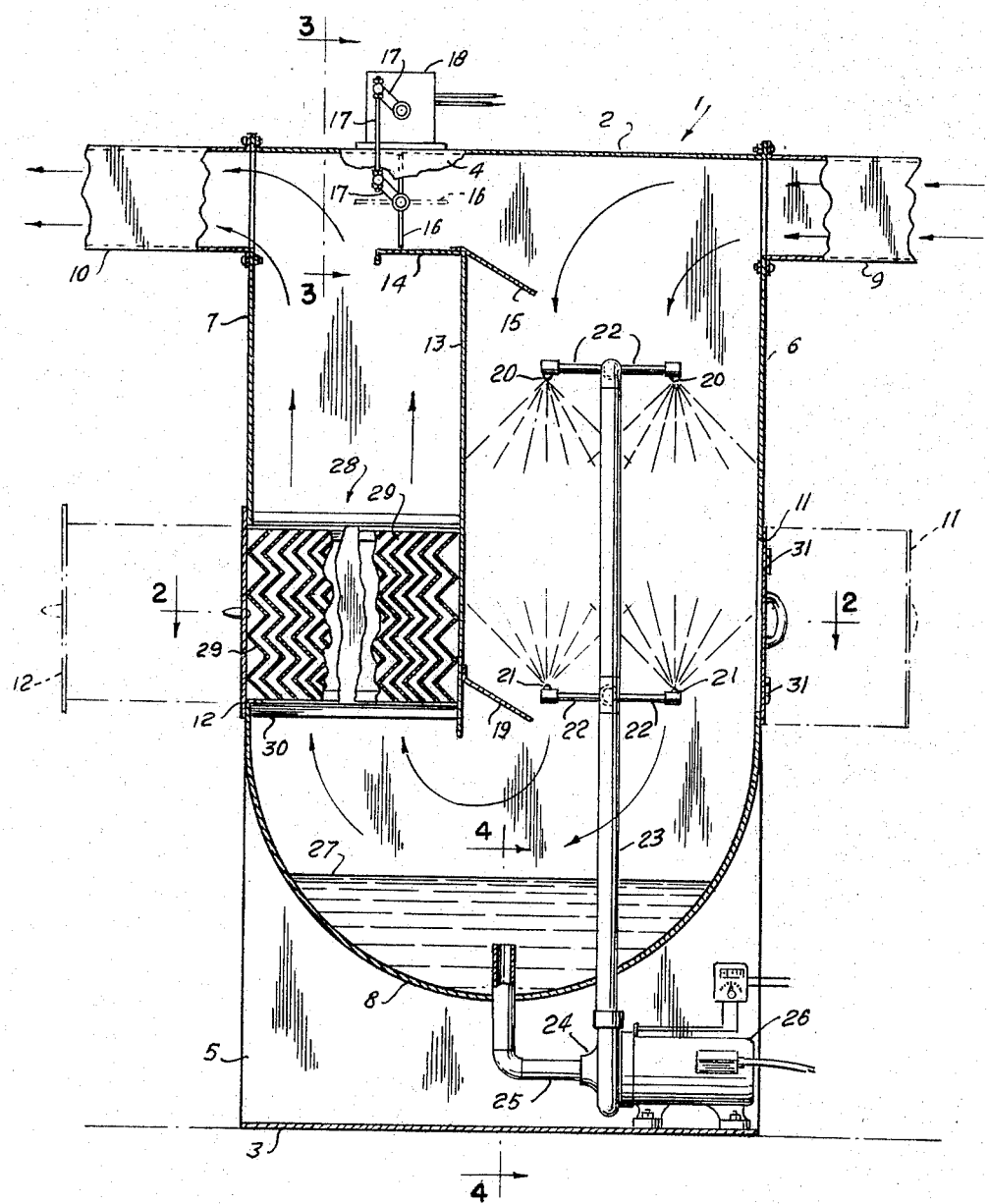
FIG. 1 is an elevational view, partly in section and partly broken away, of a moisture control unit embodying the invention.

Referring to the drawing, the apparatus of the invention includes a vertically disposed, generally rectangular cabinet, designated generally by the numeral 1, which advantageously may be formed of sheet metal. The cabinet 1 has a square top 2 and bottom 3, and its height is substantially greater than its lateral dimensions.

The cabinet 1 has two opposite sides 4, 5 whereby the top 2 and the bottom 3 are connected in parallel, spaced apart relation to each other, and has two other sides which are formed in part by a pair of side panels 6, 7, substantially shorter than the height of the cabinet 1, which extend between the first mentioned sides 4, 5, in spaced apart relation to the top 2.

The cabinet 1 further includes an arcuate false bottom 8 which is curved about an axis perpendicular to the first mentioned sides 4, 5 and extends between them, with its opposite ends facing upwardly, above the bottom 3 and below the side panels 6, 7, and in spaced apart relation thereto, respectively.

An air inlet duct 9 and an air discharge duct 10, which communicate with the interior of the cabinet 1, are connected to the last mentioned sides of the cabinet 1, immediately adjacent the top 2, between the top 2 and the side panels 6, 7, respectively.

A pair of access doors 11, 12, which extend between the first mentioned sides 4, 5, are provided in the last mentioned sides of the cabinet 1, between the respective side panels 6, 7 and the corresponding ends of the false bottom 8.

The cabinet 1 has a vertical partition 13 which extends between the first mentioned sides 4, 5 in spaced apart relation to the side panels 6, 7, the access doors 11, 12, the top 2, and the false bottom 8, and forms therewith a continuous fluid passage communicating at its ends with the air inlet duct 9 and the air discharge duct 10, respectively.

A short, horizontal partition 14, which extends between the first mentioned sides 4, 5, and extends laterally outwardly from the upper end of the vertical partition 13, on the side thereof nearest the air discharge duct 10, forms with the top 2 and a baffle 15, which is inclined laterally outwardly and downwardly from said upper end of the vertical partition 13, on the side thereof nearest the air inlet duct 9, a bypass connection between the air inlet duct 9 and the air discharge duct 10.

A damper 16, which is positioned between the top 2 and the horizontal partition 14, and extends between the first mentioned sides 4, 5 and is pivotally connected thereto for rotative adjustment about a horizontal axis perpendicular to the said first mentioned sides 4, 5, controls the flow of air through the bypass connection above described.

The damper 16 is operated, through linkage 17, by an electric motor 18 on the top 2 of the cabinet 1. The motor 18 is operated by remote control, by means not shown.

The motor 18 advantageously may be a Honeywell Modutrol valve control motor, for example.

A baffle 19, which is similar to the above mentioned baffle 15, extends between the first mentioned sides 4, 5 and is inclined laterally outwardly and downwardly from the vertical partition 13 near its lower end, on the side thereof nearest the air inlet duct 9.

The baffles 15, 19 serve to deflect the flow of air away from the vertical partition 13, on the side thereof nearest the air inlet duct 9, as it flows downwardly and upwardly through the cabinet 1, around the lower end of the vertical partition 13.

A plurality of downwardly facing spray nozzles 20, and a plurality of upwardly facing spray nozzles 21, which are arranged within the cabinet 1, on the side of the vertical partition 13 nearest the air inlet duct 9, are positioned with the downwardly facing nozzles 20 uppermost, in opposing, spaced apart relation to the upwardly facing nozzles 21.

The nozzles 20, 21, which are arranged in the path of air flowing through the cabinet 1, as above described, are uniformly spaced, and are connected by branch pipes 22 and a discharge pipe 23 to a water pump 24, which is supported on the bottom 3 of the cabinet 1, below the false bottom 8. The water pump 24 has a suction pipe 25 which extends upwardly through the false bottom 8. The water pump 24 is driven by an electric motor 26, and advantageously may have a built in, thermostatically controlled heating element to protect it against freezing during times when the apparatus may be unattended.

Make-up water is supplied to the cabinet 1, by means not shown, as necessary to maintain a predetermined water level therein, as at 27, below the lower end of the vertical partition 13 and in spaced apart relation thereto.

A self contained dephlegmator unit 28, which consists of a plurality of vertically disposed, zigzag baffle elements 29 connected in parallel, laterally spaced relation to each other, is disposed within the cabinet 1, near the lower end of the vertical baffle 13 and on the side thereof nearest the air discharge duct 10.

The dephlegmator unit 28 is aligned with the access door 12 and is rigidly connected thereto, and is slidable on tracks 30 whereby the dephlegmator unit 28 is removable bodily from the cabinet 1 with the access door 12.

The access door 11, which is positioned on the opposite side of the cabinet 1 from the above mentioned access door 12, is connected by hinges, as at 31.

In operation, preheated air, which has been heated by means not shown, may be drawn or blown through the cabinet 1, through the air inlet duct 9 and the air discharge duct 10, and a greater or lesser portion thereof may be caused to flow downwardly and upwardly in the cabinet 1, around the vertical partition 13, by operation of the damper 16. At the same time a portion of the heated air may be caused to flow through the bypass connection above described, as desired.

Water in finely divided state, as discharged from the nozzles 20, 21, is commingled with the heated air, as it enters the cabinet 1 and flows downwardly therein, on the side of the vertical partition 13 nearest the air inlet duct 9. The larger droplets of water are separated from the humidified air, as it approaches the false bottom 8 and thereafter reverses its direction of flow, and is caused to flow upwardly, on the side of the vertical partition 13 nearest the air discharge duct 10. Finally, any remaining water in the liquid state is separated from the air as it is passed upwardly through the dephlegmator unit 28.

Condensation of moisture in the air ducts (not shown) communicating with the air discharge duct 10 may be avoided, in the arrangement above described, by operation of the damper 16, whereby the humidified air, containing water vapor, may be reheated, by admixture with heated air flowing through the bypass connection above described, as it is discharged from the cabinet 1, through the air discharge duct 10.

The invention may be modified in various ways without departing from the spirit and scope thereof.

I claim:

1. In a moisture control unit for regulating the humidity of a stream of preheated air, the combination of a vertically disposed, generally rectangular cabinet having an air inlet duct and an air discharge duct communicating with openings therefor in two opposite sides, immediately adjacent the top thereof, and having an arcuate false bottom extending between two other sides, above the bottom thereof and in spaced apart relation thereto, and having its opposite end portions facing upwardly and merging with said first mentioned sides, a vertical baffle extending between said last mentioned sides, below the top of the cabinet and above said false bottom, and forming with said first mentioned sides a fluid passage extending downwardly and upwardly through the cabinet, on opposite sides of said vertical partition, between said air inlet duct and said air discharge duct, a short, horizontal partition forming with said vertical partition a bypass fluid passage immediately adjacent the top of the cabinet, above the said vertical partition and between said air inlet duct and said air discharge duct, a damper in said bypass passage controlling the flow of air through it, two sets of spray nozzles in the cabinet, on the side of said vertical partition nearest said air inlet duct, positioned one above the other in oppositely facing, mutually opposing relation, a water pump on the bottom of the cabinet, below the false bottom thereof, having a suction pipe and a discharge pipe extending upwardly through said false bottom, and branch pipes connecting the discharge pipe to the respective nozzles, and a dephlegmator unit in the cabinet, near the lower end of said vertical partition and on the side thereof nearest said air discharge duct, comprising a plurality of vertically extending baffles arranged in parallel, closely spaced relation to each other.

2. The structure of claim 1, and a pair of inclined baffles extending downwardly and laterally outwardly from said vertical partition, adjacent its upper and lower ends, on the side thereof nearest said air inlet duct.

3. The structure of claim 2, and a pair of access doors in each of said first mentioned sides of the cabinet, immediately above said false bottom, one of said doors being hinged, and said dephlegmator unit being self contained and being slidable on tracks whereby it is removable bodily from the cabinet with the other of said doors.

References Cited

UNITED STATES PATENTS

| 1,501,416 | 7/1924 | Lane. | |
| 1,978,546 | 10/1934 | McCombie | 55—257 |
| 2,035,628 | 3/1936 | Whitmer. | |
| 2,144,626 | 1/1939 | Hewitt. | |
| 2,239,595 | 4/1941 | Cummings | 55—257 |
| 2,468,865 | 5/1949 | Campobasso et al. | 261—17 |

FOREIGN PATENTS 694,404    7/1953    Great Britain.

HARRY B. THORNTON, *Primary Examiner.*

S. W. SOKOLOFF, *Assistant Examiner.*